United States Patent
Lindemann et al.

(10) Patent No.: US 10,026,199 B2
(45) Date of Patent: Jul. 17, 2018

(54) VEHICLE WINDOW IMAGE DISPLAY SYSTEM AND METHOD

(71) Applicant: GM GLOBAL TECHNOLOGY OPERATIONS LLC, Detroit, MI (US)

(72) Inventors: Todd P. Lindemann, Howell, MI (US); Antonio R. Vittorini, Macomb, MI (US); Georges H. Tamer, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 86 days.

(21) Appl. No.: 15/276,897

(22) Filed: Sep. 27, 2016

(65) Prior Publication Data

US 2018/0089859 A1  Mar. 29, 2018

(51) Int. Cl.
| | |
|---|---|
| *G06T 11/00* | (2006.01) |
| *B60R 25/104* | (2013.01) |
| *H04L 29/08* | (2006.01) |

(52) U.S. Cl.
CPC .............. *G06T 11/00* (2013.01); *H04L 67/12* (2013.01)

(58) Field of Classification Search
CPC .............................. G06T 11/00; B60R 25/104
See application file for complete search history.

(56) References Cited

U.S. PATENT DOCUMENTS

| | | | | |
|---|---|---|---|---|
| 2009/0113775 | A1* | 5/2009 | Netter ................... | G06Q 30/02 40/591 |
| 2012/0044337 | A1* | 2/2012 | Mauderer ................ | B60R 1/00 348/77 |
| 2015/0077235 | A1* | 3/2015 | Pisz ...................... | B60R 25/104 340/426.23 |
| 2015/0254694 | A1* | 9/2015 | Filip .................. | G06Q 30/0207 705/14.1 |
| 2016/0236612 | A1* | 8/2016 | Caron ................... | G09F 27/005 |

\* cited by examiner

*Primary Examiner* — Gregory J Tryder
*Assistant Examiner* — Yi Yang

(57) ABSTRACT

A system to display an image on a vehicle window including a memory, controller, transceiver, external display, sensor, and a plurality of windows. The memory includes one or more executable instructions. The controller is configured to execute the instructions. The transceiver can receive data transmissions. The external display is configured to exhibit an image on the windows, the exhibited image being visible in the external vehicle environment. The sensor measures a selected target being in the vehicle environment. The sensor signally communicates target measurement. The instructions enable the controller to: receive the data transmission with digital image information; operate the sensor to make at least one target measurement of the selected target; receive the target measurement signal; determine the location of the selected target; determine the window to be closest to the selected target; and operate the external display to exhibit a representative image.

18 Claims, 7 Drawing Sheets

VEHICLE WINDOW IMAGE DISPLAY SYSTEM AND METHOD

INTRODUCTION

A vehicle owner may be outside the vehicle and in an unfamiliar location. As a result, they may develop a sense of being alone and unsafe. A vehicle function that would help avert nefarious activity and provide the owner with a sense of security and comfort while in the unfamiliar location is therefore desired.

SUMMARY

A system to display an image on a vehicle window is herein presented. The system includes a memory, controller, transceiver, external display, sensor, and a plurality of windows. The memory includes one or more executable instructions. The controller is configured to read and execute the executable instructions. The transceiver is configured to receive at least one data transmission. The windows are installed on a vehicle. The external display is configured to exhibit an image on at least one of the windows, the exhibited image being visible in the environment external to the vehicle. The sensor is configured to make at least one measurement of a selected target being located in the external vehicle environment. The sensor is configured to communicate a signal which corresponds to the target measurement. The executable instructions enable the controller to: receive the data transmission with digital image information; operate the sensor to make at least one target measurement of the selected target; receive the target measurement signal from the sensor; determine the location of the selected target based on the target measurement signal; determine the window to be closest to the selected target based on the determined location; and operate the external display to exhibit a representative image adapted to mimic the presence of a person within the vehicle on the window determined to be closest to the selected target.

The system may further incorporate a mobile computing device which is configured to transmit and receive at least one data transmission. The mobile computing device includes a mobile memory storage and mobile processing device. The mobile memory storage includes an installed VID module, the VID module includes one or more executable instructions and is configured to create the representative image to be exhibited on at least one of the plurality of windows. The mobile processing device is moreover configured to read and execute the executable instructions of the VID module. The executable instructions enable the mobile processing device to: receive digital image information; adapt the digital image information into a representative image that mimics the presence of a person within the vehicle; transmit the data communication with a representative image to the controller.

The digital image information may be received from a database located in a data center. The digital image information may be generated by a digital camera on the mobile computing device. The system may further include an audio system and the executable instructions may further enable the controller to generate audio output corresponding with the representative image. The external display may be a projector. The external display may be a window incorporating smart glass. The sensor may be a camera configured to sense objects in the vehicle environment. The sensor may be configured to sense objects in the vehicle environment and selected from a group that includes a set of RADAR sensors, SONAR sensors, LIDAR sensors, or infra-red emitters and receivers.

A method to display an image on a vehicle window is also herein presented. The method includes: providing a memory having one or more executable instructions; providing a controller configured to read and execute the executable instructions; providing a transceiver configured to receive at least one data transmission, the data transmission with digital image information; providing a plurality of windows installed on a vehicle; providing an external display configured to exhibit an image on at least one of the plurality of windows, the exhibited image being visible in the environment external to the vehicle; providing a sensor configured to make at least one measurement of a selected target located in the environment external to vehicle, the sensor configured to communicate a signal which corresponds to the target measurement; receiving (at the controller) a data transmission with digital image information; operating (via the controller) the sensor so as to make at least one target measurement of the selected target; receiving (at the controller) the target measurement signal from the sensor; determining (via the controller) the location of the selected target based on the target measurement signal; determining (via the controller) the window to be closest to the selected target based on the determined location; and operating (via the controller) the external display so as to exhibit representative image that mimics the presence of a person within the vehicle on the window determined to be closest to the selected target.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
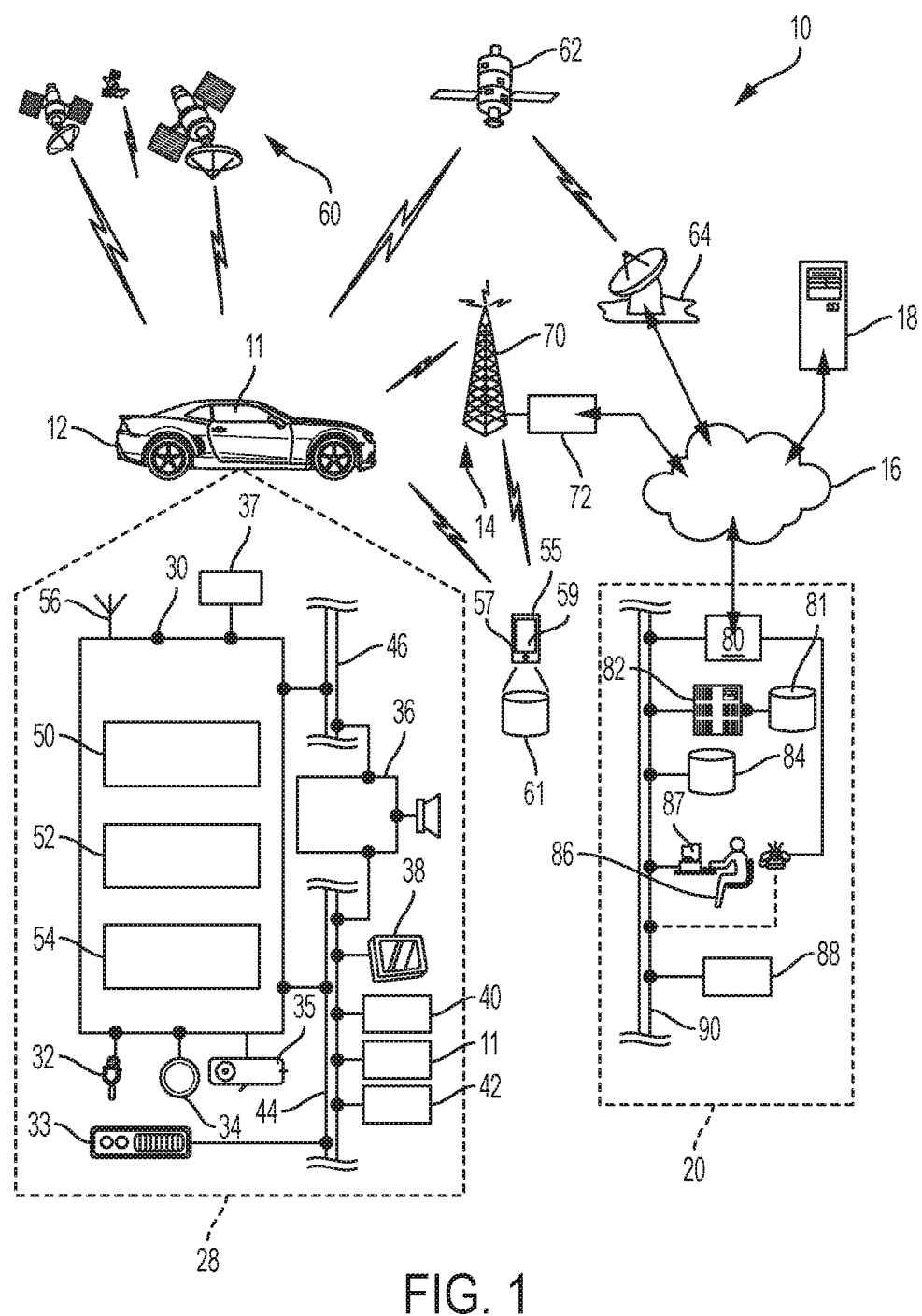
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, sports utility vehicles (SUVs), recreational vehicles (RVs), marine vessels (e.g., boats), aircraft, etc., can also be used. Some of the vehicle electronics 28 is shown generally in FIG. 1 and includes a telematics unit 30, a microphone 32, a projector 33, one or more pushbuttons or other control inputs 34, a vehicle camera 35, an audio system 36, sensory input unit 37, an internal visual display 38, and a GPS module 40 as well as a number of vehicle system modules (VSMs) 42. Some of these devices can be connected directly to the telematics unit 30 such as, for example, the microphone 32, pushbutton(s) 34, camera 35, and sensory input unit 37, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. It should be appreciated that various other connection configurations can also be utilized, as the configuration shown in FIG. 1 is only an example of one particular implementation.

Telematics unit 30 can be an OEM-installed (embedded) or aftermarket device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as GSM or CDMA and thus includes a standard cellular chipset 50 for voice communications like hands-free calling, a wireless modem for data transmission (transceiver), an electronic processing device 52, at least one digital memory device 54, and at least one dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a mobile computing device 57, such as a smart phone, personal laptop computer, smart wearable device, or tablet computer having two-way communication capabilities, a netbook computer, or any suitable combinations thereof. The mobile computing device 57 can include computer processing capability through a mobile processing device, a transceiver capable of communicating with wireless carrier system 14, mobile memory storage 61, digital camera 55, a user interface 59, and/or a GPS module capable of receiving GPS satellite signals and generating GPS coordinates based on those signals. User interface 59 may be embodied as a touch-screen graphical interface capable of user interaction as well as displaying information. Digital camera 55 may include the ability to generate digital images (i.e., digital image information) that are bitmapped data representations of tangible objects captured and stored to memory 61 by operations generally known in the art. Examples of the mobile computing device 57 include the iPhone™ manufactured by Apple, Inc. and the Droid™ manufactured by Motorola, Inc. as well as others. While the mobile computing device 57 may include the ability to communicate via cellular communications using the wireless carrier system 14, this is not always the case. For instance, Apple manufactures devices such as the various models of the iPad™ and iPod Touch™ that include the processing capability, interface 59, and the ability to communicate over a short-range wireless communication link. However, the iPod Touch™ and some iPads™ do not have cellular communication capabilities. Even so, these and other similar devices may be used or considered a type of wireless device, such as the mobile computing device 57, for the purposes of the system and method described herein.

Mobile device 57 may be used inside or outside of vehicle 12, and may be coupled to the vehicle 12 by wire or wirelessly. The mobile device 57 also may be configured to provide services according to a subscription agreement with a third-party facility or wireless/telephone service provider. It should be appreciated that various service providers may utilize the wireless carrier system 14 and that the service provider of the telematics unit 30 may not necessarily be the same as the service provider of the mobile devices 57.

When using a short-range wireless connection (SRWC) protocol (e.g., Bluetooth/Bluetooth Low Energy or Wi-Fi), mobile computing device 57 and telematics unit 30 (i.e., via antenna 56) may pair or link one with another when within a wireless range (e.g., prior to experiencing a disconnection from the wireless network). In order to pair, mobile computing device 57 and telematics unit 30 may act in a BEACON or DISCOVERABLE MODE having a general identification (ID); SRWC pairing is known to skilled artisans. The general identifier (ID) may include, e.g., the device's name, unique identifier (e.g., serial number), class, available services, and other suitable technical information. Mobile computing device 57 and telematics unit 30 may also pair via a non-beacon mode. In these instances, the call center 20 may participate in pairing mobile computing device 57 and telematics unit 30. For example, the call center 20 may initiate the inquiry procedure between the telematics unit 30 and mobile computing device 57. And call center 20 may identify mobile computing device 57 as belonging to the user of vehicle 12 and then receive from the mobile computing device 57 it's unique mobile device identifier and authorize the telematics unit 30 via the wireless communication system 14 to pair with this particular ID.

Once SRWC is established, the devices may be considered bonded as will be appreciated by skilled artisans (i.e., they may recognize one another and/or connect automatically when they are in a predetermined proximity or range of one other. In other words—they may become, at least temporarily, network participants). Call center 20 may also authorize SRWC on an individual basis before completion. Through implementation of telematics unit 30, mobile device 57 may be configured to control vehicle devices, for example, mobile device 57 may project images via projector 33.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, such as, for example, the vehicle's power door locks, headlights, projector, or sensory input unit. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, projector 33, pushbuttons(s) 34, a camera 35, a sensory input unit 37 (including multiple sensors 37a, 37b, 37c), audio system 36, window 11, and internal display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to telematics unit 30 to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above.

Projector 33 may be a Digital Light Processing ("DLP") projector that may allow white light to be projected through an array of movable mirrors that control the intensity of each pixel of light as well as the color. According to the particular embodiment shown here, projector 33 is operatively coupled to both vehicle bus 44 and entertainment bus 46 and may project images from within the vehicle 12, onto the surface of at least one window 11, to make an accurate presentation that is exhibited and visible from the outside of vehicle 12 (i.e., an external display). Projector 33 may moreover be rotational such that it may project images onto any selected window surface of vehicle 12 and, more specifically, project the images onto a selected portion of that window surface.

Window 11 may be doubled flat paned. According to the particular embodiment shown here, each window 11 is operatively coupled to both vehicle bus 44 and entertainment bus 46 and may be implemented as smart glass. The term "smart glass" refers generally to glass or glazing that changes light transmission properties when voltage, light or heat is applied. One example of such technology is polymer dispersed liquid crystal devices. It is understood that, rather that changing light transmission properties of an entire pane of glass, the light transmission properties of specific regions of a pane of glass may be selectively changed. For example, to change the light transmission properties of regions of the window 11 in a manner that makes an accurate presentation that is exhibited and visible from the outside of vehicle 12 (i.e., an external display). To this effect, each window may be further equipped with an adapted heads-up display (HUD), being any transparent display that can exhibit the representative image to the vehicle environment target and without requiring the target to look away from their usual viewpoints. It should be appreciated that one or more of the vehicle windows 11 may be implemented as smart glass, each of which may be in collaboration via telematics unit 30.

Vehicle camera 35 can sense objects in the vehicle environment which are located within a certain proximity of vehicle 12 (e.g., within 50 feet). Camera 35 is connected to telematics unit 30 and may, for example, be embodied as an eye-tracking camera 35 which may review and analyze a person's eye movements or gestures and provide a signal to telematics unit 30. To facilitate this effect, digital memory device 54 may be equipped with one or more modules containing reflection study software that assists camera 35 and/or projector 33 to know where target may likely be located after certain semi-predictable target gestures. Camera 35 may also, for example, be adapted to receive infrared light. Infrared (IR) light is electromagnetic radiation with wavelengths longer than those of visible light, extending from the nominal red edge of the visible spectrum at 700 nanometers (nm) to 1 mm. This range of wavelengths corresponds to a frequency range of approximately 430 THz down to 300 GHz.

Sensory input unit 37 can sense objects in the vehicle environment which are located within a certain proximity of vehicle 12 (e.g., within 50 feet). Sensory input unit 37 is connected to telematics unit 30 and may, for example, be a set of ultrasonic sensors including a first ultrasonic sensor 37A, a second ultrasonic sensor 37b and a third ultrasonic sensor 37C (referenced collectively or individually as 37). Sensory unit 37 operates on a principle similar to RADAR (e.g., Ultra Short-Range Radar) or SONAR in that attributes of a target are evaluated through interpretation of echoes. Sensory unit 37 generates high frequency sound waves and evaluate each sound wave echoed back to sensory unit 37. The sensors 37a, 37b, 37c determine a time interval between the sending of an original signal and the receiving of an echo of the same signal to determine a distance to an object. Sensory unit 37 operates on a principle similar to LIDAR in that attributes of a target are evaluated through interpretation of illuminations and reflections. Sensory unit 37 may also, for example, be a set of IR emitters and receivers may be installed along one or both edges of the window 11 to adequately sense a target. Furthermore, sensory input unit 37 may be installed along one or both edges of the window 11 to adequately sense a target.

Internal display 38 is preferably a graphics display, such as a touch screen on the instrument panel or a heads-up display reflected off of the windshield and other windows, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Wireless carrier system 14 can implement any suitable communications technology, including for example, analog technologies such as AMPS, or the newer digital technologies such as CDMA (e.g., CDMA2000 or 1×EV-DO) or GSM/GPRS (e.g., 4G LTE, 4.5G, and/or 5G). As will be appreciated by skilled artisans, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network connected to one or more landline telephones and connects wireless carrier system 14 to data center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live adviser 86 by regular phone, backend computer 87, or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from one or more of the data bases 84, telematics unit 30, and mobile computing device 57.

Data Center controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (not shown) connected between the switch 80 and network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Video Image Display (VID) Module

The user of mobile computing device 57 and the vehicle 12 may create a vehicle-ownership user account. The user may perform tasks to create this account through a variety of devices such as remote computer 18 and mobile computing device 57, when purchasing vehicle 12 at a dealership (not shown), or through live advisor 86 at call center 20. The user account may be stored in database 84 and accessible on server 82 (i.e., to support backend functions). Call center 20 may also access one or more additional remote servers and/or remote databases (e.g., Department of Motor Vehicles databases) to receive information in support of the user account.

The user account may include various user data. The user data may include an account username and account password as well as a user profile which includes information such as, but not limited to the user name, address, driver's license number, profile picture, sound data, mobile computing device information and vehicle identification information associated with vehicle 12 (i.e., general identifier (ID)). The user account may additionally store a variety of other personal profiles. For example, one personal profile may include information such as, but not limited to the name of an associate of the user (e.g., husband/boyfriend), their address, profile picture, associated sound data (e.g., audio-based voice recordings), and mobile computing device information (e.g., phone number).

The mobile computing device 57 may receive a vehicle image display module (VID module) that is a software application of executable instructions and to be associated with vehicle 12 and user account. For example, the user of mobile device 57 may visit an online software application store or web-service and download the VID module therefrom. Mobile computing device 57 may moreover install this VID module onto mobile memory 61 of the mobile computing device 57. VID module may moreover include one or more graphical user interfaces (GUIs) which include one or more prompts to instruct the user to provide information (e.g., validating data) to support user account creation as well as command the VID module functionality.

Mobile device with the installed VID module may be validated by the call center 20 to ensure an authentic association between the VID module user and vehicle 12. In order to authenticate the module, mobile device 57 may convey this information cellularly to the call center 20. In some instances, this transmission is performed securely using one or more known encryption methodologies. The call center 20 may receive the validating data and verify the accuracy.

Once validated, through VID functionality, mobile device 57 may access the backend user account and configure at least one telematics unit parameter (e.g., a software setting) granting mobile device control of the telematics unit 30 (e.g., enabling remote commands). Mobile computing device 57 may thus be configured to transmit information as well as a request or command to the telematics unit 30 (i.e., via wireless carrier system 14 or via satellite cluster 60). It should be appreciated that this data transmission generally routes to call center 20 before being transmitted or retransmitted to telematics unit 30 (e.g., also via cellular communication).

The telematics unit 30 then receives the info, request, or command. For example, the user of mobile device 57 may control projector 33 to display an image that appears on one or more windows 11 of vehicle 12. In other instances, the user of mobile device 57 may control the smart glass aspect of window 11 to display an image.

Figure 2:
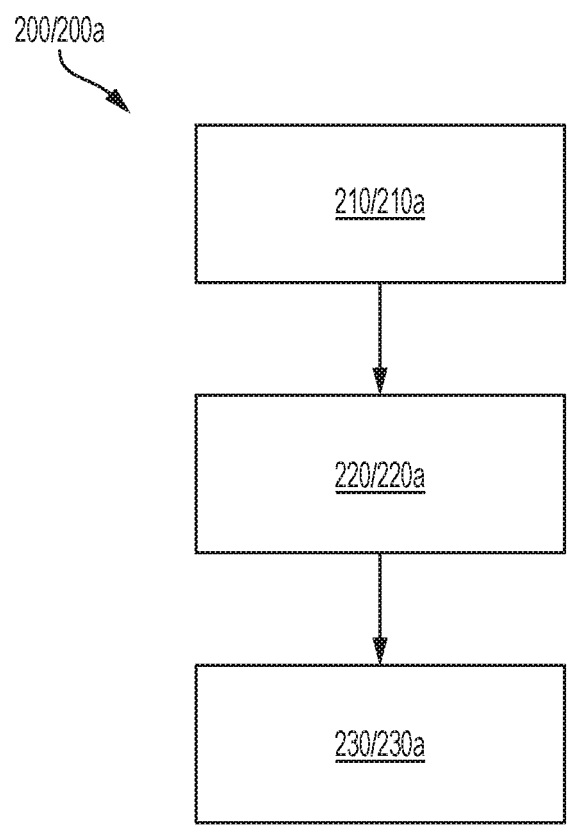
FIG. 2 shows an exemplary flow chart of an exemplary algorithmic method of a vehicle image display module.
Figure 3:
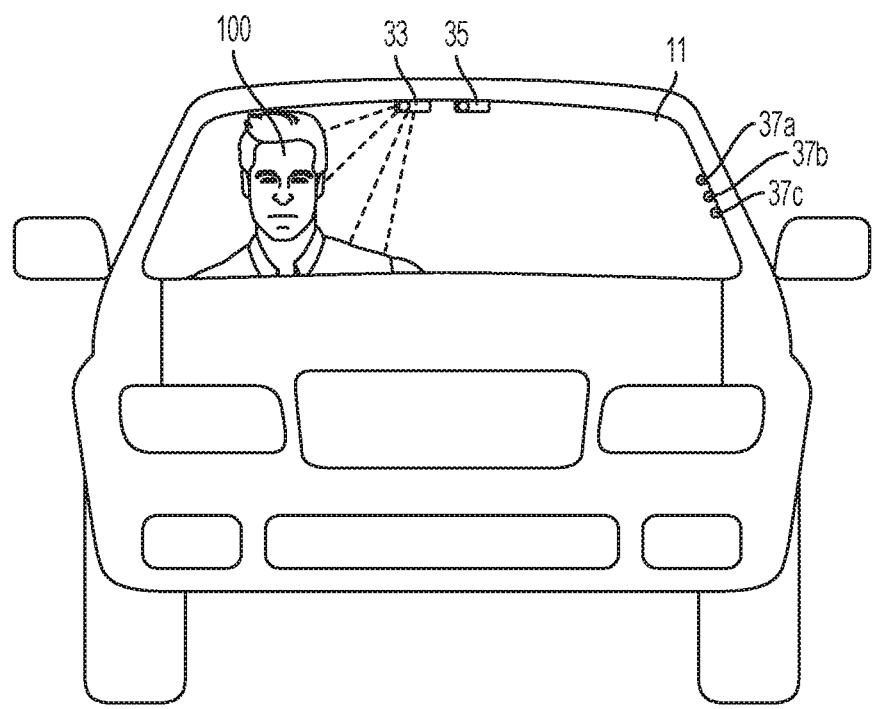
FIG. 3 shows a front view of an aspect of the vehicle window image display system.
Figure 4:
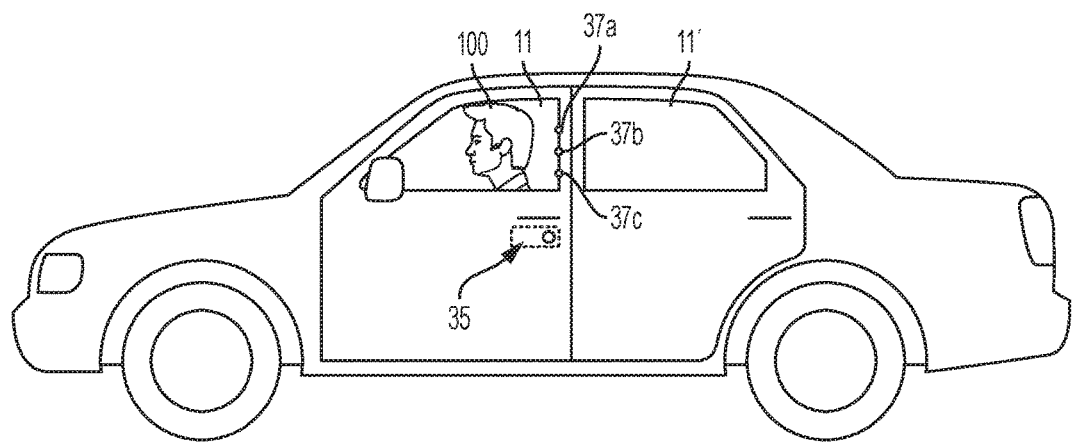
FIG. 4 shows a side view of the vehicle window image display system of FIG. 2.
Figure 5:
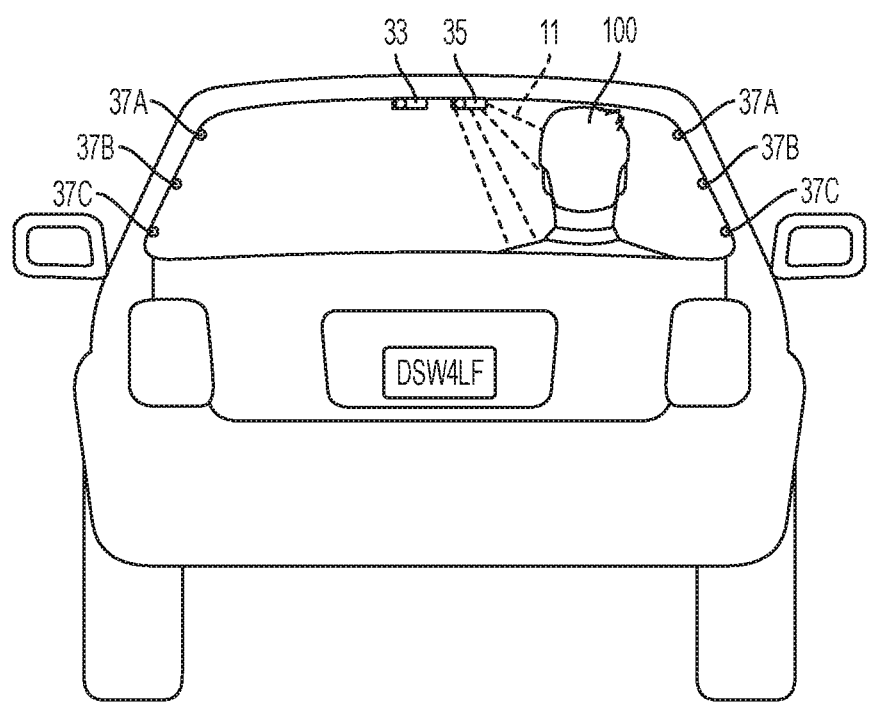
FIG. 5 shows a rear view of the vehicle window image display system of FIG. 2.

As shown in FIG. 2, in one embodiment of the VID module 200, a user may implement the module's executable instructions on mobile device 57 to allow for remote display of an image, mimicking the presence of a person situated within vehicle 12, on at least one vehicle window 11. For instance, in step 210 of module executable instruction implementation, VID module 200 may be commanded to communicate with data center 20 to access and select one of the uploaded personal profiles. In this step, the user may otherwise select a stock image that has been previously stored on database 84. Moreover, in this step, the user may select at least one voice recording corresponding with the profile picture. In step 220, VID module 200 may manipulate the uploaded picture/stock photo to make the subject look as if they could realistically be situated inside vehicle 12 (e.g., as if they were properly sitting in the vehicle cabin). Such manipulation may involve extrapolating certain digital image information from the selected digital image to generate a unique three-dimensional mapping based derivative of the digital image. Once modification is made proper, in step 230, VID module 200 will transmit to telematics unit 30 a data transmission including a representative image that mimics the presence of a person within vehicle 12. It should be understood that part or all of the representative image/video completion may be supported through the functioning of telematics unit 30. Thus, in certain instances, modifications made in step 220 may be considered nominal in nature. The data transmission may moreover include the voice recording as well as a command that instructs telematics unit 30 to begin the processes of displaying the image.

In another embodiment of VID module 200a, in step 210a, the user may access digital camera 55 and take at least one portrait picture (e.g., a selfie) or portrait video. The user may moreover access a microphone on their mobile computing device to record sound data to correspond with the picture/video. In step 220a, VID module 200a will manipulate the picture/video to make the portrait's subject look as if they could realistically be situated inside vehicle 12. Such manipulation may involve extrapolating certain digital image information from the digital image/video to generate a unique three-dimensional mapping based derivative of the digital image/video. Once modification is made proper, in step 230a, VID module 200a will transmit to telematics unit 30 a data transmission including a representative image that mimics the presence of a person within vehicle 12. It should be understood that part or all of the representative image/video completion may be supported through the functioning of telematics unit 30. Thus, in certain instances, modifications made in step 220a may be considered to be nominal in nature. The data transmission may moreover include the recorded sound data as well as a command that instructs telematics unit 30 to begin the processes of displaying the image. It should be appreciated that the user of VID module 200a may not be the vehicle operator and may be located distantly from vehicle 12.

Vehicle Window Display System

As shown in FIGS. 3-7, upon receiving digital image information at antenna 56 (via one of the wireless carrier systems or via SRWC), telematics unit 30 can control projector 33 (i.e., external display) to display a representative image on any one of windows 11. In this embodiment, telematics unit 30 will moreover operate vehicle camera 35 (i.e., a sensor) to monitor the vehicle environment target 102. Camera 35 will make one or more measurements of target 102 and transmit signals to telematics unit 30 which can be used to provide an accurate understanding of the target location. As stated above, digital memory device 54 may be equipped with one or more modules containing reflection study software to help guide camera 35 and/or projector 33 to predict where target may likely be located after certain gestures. Telematics unit 30 (processor 52) will then use the digital image information signals (and/or reflective study) to subsequently determine the specific location of target 102 in the vehicle's environment. Once this determination has been made, telematics unit 30 will then determine and select the window considered closest to target 102 (in certain instances, a portion of the window is further selected). At this point, telematics unit will operate projector and rotate it so as to exhibit the representative image on the window 11 determined closest to target 102.

It should be understood, as stated above, in certain embodiments of telematics unit 30 may manipulate the digital image and adapt the representative image. Telematics unit 30 may complete a portion or all of these manipulations. Such manipulations may moreover involve extrapolating certain digital image information from the digital image to generate a unique three-dimensional mapping based derivative of the original digital image. It should be further appreciated that this sequence of functional events may occur on an ongoing basis. As a result, with reference to FIG. 7, the representative image 100 will at all times be in the line of sight 103 of the target 102 (shown as a vandal/ruffian).

Figure 6:
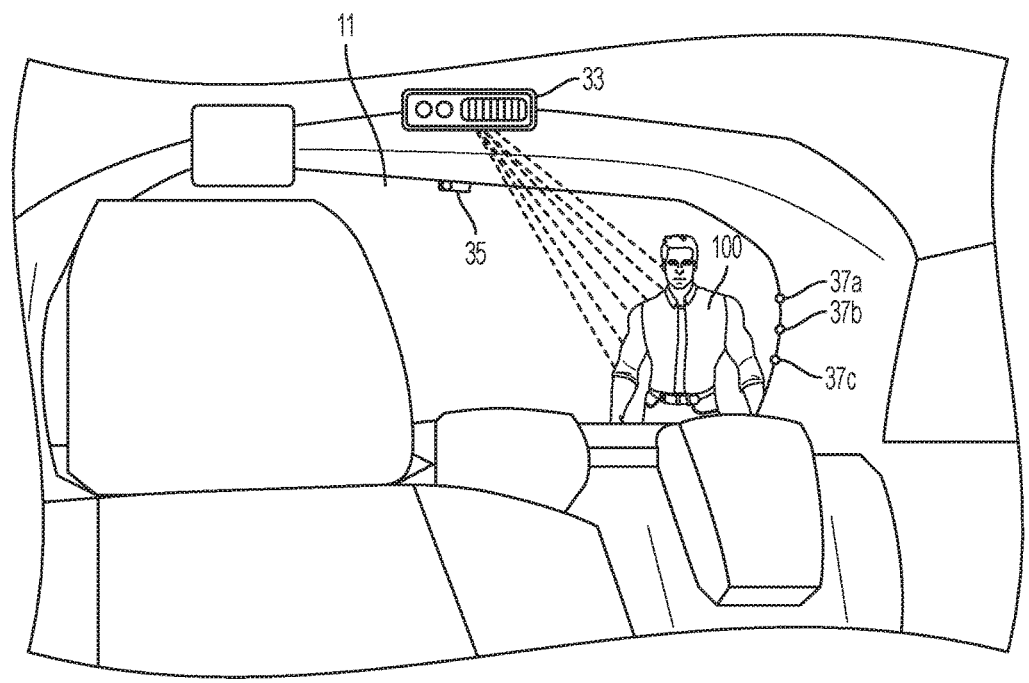
FIG. 6 shows another aspect of the vehicle window image display system.
Figure 7:
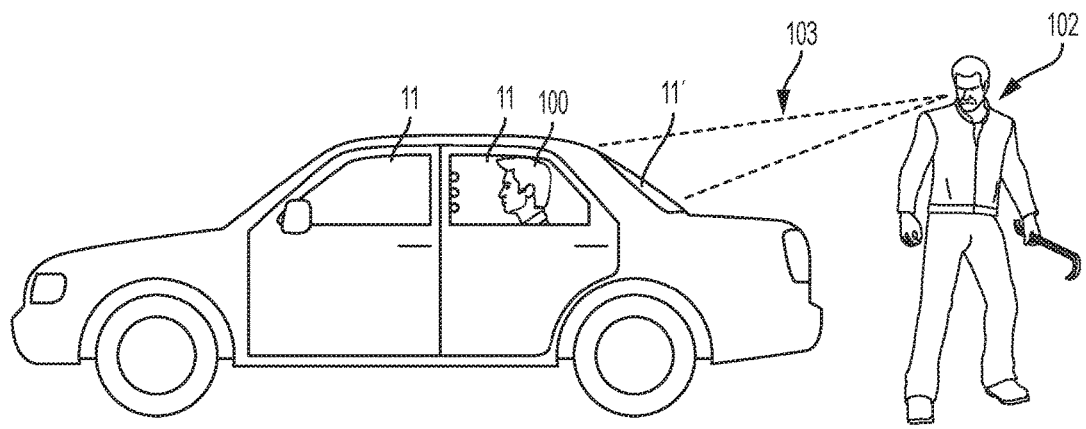
FIG. 7 shows the environment in which the vehicle window image display system may be implemented.

It should be appreciated, representative image 100 may be shown through more than one window 11 to improve the effect of exhibiting the display in the vehicle environment. For instance, as shown in FIG. 7, target 102 may view the representative image 100 on both the rear-passenger-side window 11 and rear window 11'. With reference to FIG. 6, it should be appreciated that representative image 100 may or may not be accurate to reflect an image of a person seated within vehicle 12. For instance, as shown, the image of a herculean man (i.e., a generic bodybuilder) is represented in the vehicle environment as a person standing in vehicle 12.

In another embodiment, vehicle 12 will be equipped with sensory input unit 37 and the input will be used to make one or more measurements of target 102 and transmit signals to telematics unit 30 to provide an accurate understanding of the target location. Telematics unit 30 (processor 52) will then use the signals to subsequently determine the specific location of target 102. In other embodiments, vehicle 12 will be equipped with smart glass windows 11. In such embodiments, once a target location determination has been made, telematics unit 30 will select the window 11 considered closest to target 102 (in certain instances, a portion of the window is further selected) and operate window 11 to exhibit the representative image 100. In certain embodiments, antenna 54 may receive recorded sound data which corresponds with the digital image information. In these embodiments, audio system 36 may play an audio output corresponding with the representative image 100.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system to display an image on a vehicle window, the system comprising:

a memory comprising one or more executable instructions, the memory located in a vehicle telematics unit;

a controller configured to read and execute the executable instructions, the controller located in the vehicle telematics unit;

a transceiver operatively coupled to the controller, the transceiver configured to receive at least one data transmission;

a plurality of windows installed on a vehicle;

an external display configured to exhibit an image on at least one of the plurality of windows, the exhibited image being visible in the environment external to the vehicle;

a sensor configured to make at least one measurement of a selected target located in the environment external to vehicle, the sensor configured to communicate a signal which corresponds to the target measurement;

wherein the executable instructions enable the controller to:

receive the data transmission comprising digital image information;

operate the sensor to make at least one target measurement of the selected target;

receive the target measurement signal from the sensor;

determine the location of the selected target based on the target measurement signal;

determine the window to be closest to the selected target based on the determined location; and operate the external display to exhibit a representative image adapted to mimic the presence of a person within the vehicle on the window determined to be closest to the selected target; and a mobile computing device configured to transmit and receive at least one data transmission and configured to be wirelessly coupled to the controller via the transceiver, wherein the mobile computing device is a smart phone, personal laptop computer, smart wearable device, or tablet computer, the mobile computing device comprising:

a mobile memory storage comprising a VID module, the VID module comprising one or more executable instructions and configured to create the representative image to be exhibited on at least one of the plurality of windows;

a mobile processing device configured to read and execute the executable instructions of the VID module;

wherein the executable instructions enable the mobile processing device to:

receive digital image information from a database located in a data center;

adapt the digital image information into a representative image that mimics the presence of a person within the vehicle; and wirelessly transmit the data communication comprising the representative image to the controller via the transceiver.

2. The system of claim 1, wherein the digital image information is generated by a digital camera on the mobile computing device.

3. The system of claim 1, further comprising an audio system; and wherein the executable instructions further enable the controller to:

generate audio output corresponding with the representative image.

4. The system of claim 1, wherein the external display is a projector.

5. The system of claim 1, wherein the external display is a window comprising smart glass.

6. The system of claim 1, wherein the sensor is a camera configured to sense objects in the vehicle environment.

7. The system of claim 1, wherein the sensor is configured to sense objects in the vehicle environment and selected from a group comprising: a set of RADAR sensors, SONAR sensors, LIDAR sensors, or infra-red emitters and receivers.

8. A method to display an image on a vehicle window, the method comprising:
providing a memory comprising one or more executable instructions, the memory located in a vehicle telematics unit;
providing a controller configured to read and execute the executable instructions, the controller located in the vehicle telematics unit;
providing a transceiver operatively coupled to the controller, the transceiver configured to receive at least one data transmission;
providing a plurality of windows installed on a vehicle;
providing an external display configured to exhibit an image on at least one of the plurality of windows, the exhibited image being visible in the environment external to the vehicle;
providing a sensor configured to make at least one measurement of a selected target located in the environment external to vehicle, the sensor configured to communicate a signal which corresponds to the target measurement;
receiving, at the controller, a data transmission comprising digital image information;
operating, via the controller, the sensor so as to make at least one target measurement of the selected target;
receiving, at the controller, the target measurement signal from the sensor;
determining, via the controller, the location of the selected target based on the target measurement signal;
determining, via the controller, the window to be closest to the selected target based on the determined location;
operating, via the controller, the external display so as to exhibit a representative image that mimics the presence of a person within the vehicle on the window determined to be closest to the selected target;
providing a mobile computing device configured to transmit and receive at least one data transmission and configured to be wirelessly coupled to the controller via the transceiver, wherein the mobile computing device is a smart phone, personal laptop computer, smart wearable device, or tablet computer, the mobile computing device comprising:
a mobile memory storage comprising a VID module, the VID module comprising one or more executable instructions and configured to create the representative image to be exhibited on at least one of the plurality of windows;
a mobile processing device configured to read and execute the executable instructions of the VID module;
receiving, at the VID module, digital image information from a database located in a data center;
adapting, via the VID module, the digital image information into a representative image that mimics the presence of a person within the vehicle; and
wirelessly transmitting, via the mobile computing device, a data communication comprising the representative image to the controller via the transceiver.

9. The method of claim 8, further comprising:
providing a digital camera installed on the mobile computing device; and
generating, by digital camera, the digital image information.

10. The method of claim 8, further comprising:
providing an audio system in the vehicle; and
generating, via the audio system, audio output corresponding with the representative image.

11. The method of claim 8, wherein the external display is a projector.

12. The method of claim 8, wherein the external display is a window comprising smart glass.

13. The method of claim 8, wherein the sensor is a camera configured to sense objects in the vehicle environment.

14. The method of claim 8, wherein the sensor is configured to sense objects in the vehicle environment and selected from a group comprising: a set of RADAR sensors, SONAR sensors, LIDAR sensors, or infra-red emitters and receivers.

15. A method to display an image on a vehicle window, the method comprising:
providing a memory comprising one or more executable instructions;
providing a controller configured to read and execute the executable instructions;
providing a transceiver configured to receive at least one data transmission;
providing a plurality of windows installed on a vehicle;
providing a projector configured to exhibit an image on at least one of the plurality of windows, the exhibited image being visible in the environment external to the vehicle;
providing a sensor configured to make at least one measurement of a selected target located in the environment external to vehicle, the sensor configured to communicate a signal which corresponds to the target measurement;
providing a mobile computing device configured to transmit and receive at least one data transmission, the mobile computing device comprising a mobile processing device and mobile memory storage comprising a VID module, the VID module comprising one or more executable instructions configured to create a representative image to be exhibited on at least one of the plurality of windows, a mobile processing device configured to read and execute the VID module instructions;
(a) accessing, via the VID module, at least one database located at a data center;
(b) receiving, at the VID module, digital image information;
(c) adapting, via the VID module, the digital image information into a representative image that mimics the presence of a person within the vehicle;
(d) transmitting, via the mobile computing device, the data communication comprising the representative image;
(e) receiving, at the controller, the data transmission comprising the representative image;
operating, via the controller, the sensor so as to make at least one target measurement of the selected target;
(g) receiving, at the controller, the target measurement signal from the sensor;

(h) determining, via the controller, the location of the selected target based on the target measurement signal;
(i) determining, via the controller, the window to be closest to the selected target based on the determined location; and
(j) based on (i), via the controller, operating the projector so as to exhibit the representative image on at least one window.

16. The method of claim 15, wherein the sensor is a camera configured to sense objects in the vehicle environment.

17. The method of claim 15, further comprising:
providing an audio system in the vehicle; and
generating, via the audio system, audio output corresponding with the representative image.

18. The method of claim 15, wherein the sensor is configured to sense objects in the vehicle environment and selected from a group comprising: a set of RADAR sensors, SONAR sensors, LIDAR sensors, or infra-red emitters and receivers.

* * * * *